(12) United States Patent
Caldwell (10) Patent No.: US 9,092,082 B2
(45) Date of Patent: Jul. 28, 2015

(54) METHODS AND APPARATUS FOR MOUNTING A TOUCH SENSOR DEVICE

(75) Inventor: Fred Caldwell, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 712 days.

(21) Appl. No.: 12/975,741

(22) Filed: Dec. 22, 2010

(65) Prior Publication Data

US 2012/0162863 A1    Jun. 28, 2012

(51) Int. Cl.
- *H05K 5/00* (2006.01)
- *H05K 7/00* (2006.01)
- *G06F 3/041* (2006.01)
- *G06F 1/16* (2006.01)

(52) U.S. Cl.
CPC ............... *G06F 3/041* (2013.01); *G06F 1/169* (2013.01); *G06F 2203/04103* (2013.01); *Y10T 29/49947* (2015.01)

(58) Field of Classification Search
CPC ..... G06F 3/03547; G06F 1/169; G06F 3/041; G06F 2203/04103; G02F 1/13338; H01H 13/702; H01H 13/703
USPC .............. 361/679.21, 679.26, 679.3; 345/173
See application file for complete search history.

(56) References Cited

U.S. PATENT DOCUMENTS

| | | |
|---|---|---|
| 3,214,663 A | 10/1965 | Kreutzer |
| 3,296,522 A | 1/1967 | Wolfendale |
| 3,541,541 A | 11/1970 | Engelbart |
| 3,873,916 A | 3/1975 | Sterki |
| 3,938,113 A | 2/1976 | Dobson et al. |
| 3,961,318 A | 6/1976 | Farrand et al. |
| 3,961,818 A | 6/1976 | Roth, Jr. et al. |
| 4,221,975 A | 9/1980 | Ledniczki et al. |
| 4,238,781 A | 12/1980 | Vercellotti et al. |
| 4,290,052 A | 9/1981 | Eichelberger et al. |
| 4,350,981 A | 9/1982 | Tanaka et al. |
| 4,364,035 A | 12/1982 | Kirsch |
| 4,367,385 A | 1/1983 | Frame |
| 4,404,560 A | 9/1983 | Williams, Jr. |
| 4,464,651 A | 8/1984 | Duhame |
| 4,464,652 A | 8/1984 | Lapson et al. |
| 4,550,221 A | 10/1985 | Mabusth |
| 4,631,524 A | 12/1986 | Brooke et al. |
| 4,720,698 A | 1/1988 | Brooke et al. |
| 4,843,387 A | 6/1989 | Arai et al. |
| 4,862,752 A | 9/1989 | Hoyt |
| 4,870,302 A | 9/1989 | Freeman |
| 4,873,400 A | 10/1989 | Rapp et al. |
| 5,028,875 A | 7/1991 | Peters |
| 5,122,785 A | 6/1992 | Cooper |

(Continued)

FOREIGN PATENT DOCUMENTS

| | | |
|---|---|---|
| EP | 226716 A2 | 7/1987 |
| EP | 880091 A2 | 11/1998 |

(Continued)

*Primary Examiner* — Bernard Rojas
(74) *Attorney, Agent, or Firm* — Osha Liang LLP (57) ABSTRACT

A touch sensor device assembly is mechanically coupled to an electronic system having a casing. The touch sensor device assembly includes a touch sensor device and a deformable material disposed on the touch sensor device. The deformable material has a non-adhesive surface that can be compressed against an interior surface of the casing by a holding element such that the touch sensor device is stationary with respect to the casing.

16 Claims, 4 Drawing Sheets

(56) References Cited

U.S. PATENT DOCUMENTS

| | | | |
|---|---|---|---|
| 5,212,452 A | 5/1993 | Mayer et al. |
| 5,288,993 A | 2/1994 | Bidiville et al. |
| 5,305,017 A | 4/1994 | Gerpheide |
| 5,313,229 A | 5/1994 | Gilligan et al. |
| 5,414,420 A | 5/1995 | Puckette et al. |
| 5,530,455 A | 6/1996 | Gillick et al. |
| 5,583,541 A | 12/1996 | Solhjell |
| 5,644,127 A | 7/1997 | Ohmae |
| 5,657,012 A | 8/1997 | Tait |
| 5,691,646 A | 11/1997 | Sasaki |
| 5,736,865 A | 4/1998 | Nelson et al. |
| 5,748,185 A | 5/1998 | Stephan et al. |
| 5,805,144 A | 9/1998 | Scholder et al. |
| 5,861,875 A | 1/1999 | Gerpheide |
| 5,867,111 A | 2/1999 | Caldwell et al. |
| 5,872,408 A | 2/1999 | Rakov |
| 5,880,411 A | 3/1999 | Gillespie et al. |
| 5,883,619 A | 3/1999 | Ho et al. |
| 5,907,152 A | 5/1999 | Dandliker et al. |
| 5,920,307 A | 7/1999 | Blonder |
| 5,941,122 A | 8/1999 | Nelson et al. |
| 5,943,052 A | 8/1999 | Allen et al. |
| 5,949,354 A | 9/1999 | Chang |
| 5,963,197 A | 10/1999 | Bacon et al. |
| 5,982,302 A | 11/1999 | Ure |
| 6,043,809 A | 3/2000 | Holechan |
| 6,204,839 B1 | 3/2001 | Mato, Jr. |
| 6,211,037 B1 | 4/2001 | Kwok |
| 6,211,878 B1 | 4/2001 | Cheng et al. |
| 6,219,037 B1 | 4/2001 | Lee |
| 6,219,038 B1 | 4/2001 | Cho |
| 6,223,846 B1 | 5/2001 | Schechter |
| 6,388,660 B1 | 5/2002 | Manser et al. |
| 6,396,477 B1 | 5/2002 | Hinckley et al. |
| 6,424,355 B2 | 7/2002 | Watanabe et al. |
| 6,449,853 B1 | 9/2002 | Brueggemann |
| 6,492,911 B1 | 12/2002 | Netzer |
| 6,538,709 B1 * | 3/2003 | Kurihara et al. ............ 349/58 |
| 6,587,093 B1 | 7/2003 | Shaw et al. |
| 6,833,825 B1 | 12/2004 | Farag et al. |
| 6,888,537 B2 * | 5/2005 | Benson et al. ............ 345/173 |
| 6,933,929 B1 | 8/2005 | Novak |
| 7,145,593 B2 | 12/2006 | Yamaguchi et al. |
| 7,145,766 B2 * | 12/2006 | Homer et al. ............ 361/679.17 |
| 7,156,693 B2 | 1/2007 | Kusaka |
| 7,348,964 B1 | 3/2008 | Gettemy et al. |
| 8,213,166 B2 * | 7/2012 | Mihara et al. ............ 361/679.1 |
| 2003/0156098 A1 | 8/2003 | Shaw et al. |
| 2004/0136154 A1 | 7/2004 | Hsu |
| 2006/0231818 A1 * | 10/2006 | Lube ............ 256/12.5 |
| 2009/0091549 A1 | 4/2009 | Matsumoto et al. |
| 2011/0285655 A1 * | 11/2011 | Nakanishi et al. ............ 345/173 |
| 2013/0057484 A1 * | 3/2013 | Chiu et al. ............ 345/173 |

FOREIGN PATENT DOCUMENTS

| | | |
|---|---|---|
| JP | 03202774 | 9/1991 |
| JP | 2002297309 A | 10/2002 |
| WO | 0152416 A1 | 7/2001 |

* cited by examiner

METHODS AND APPARATUS FOR MOUNTING A TOUCH SENSOR DEVICE

FIELD OF THE INVENTION

The present invention generally relates to electronic devices, and more specifically relates to sensor devices.

BACKGROUND OF THE INVENTION

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Touch sensor devices are typically mounted on or within their respective electronic system by employing an adhesive between the touch sensor device and the casing of the electronic system (e.g., the interior surface of the casing). This assembly method is unsatisfactory in a number of respects. For example, some adhesives may degrade over time, particularly when operated in an environment that extends beyond their rated temperature range. This degradation can lead to partial or complete delamination. Furthermore, rework of touch sensor devices that are adhered to the interior surface of a casing can be difficult, expensive, and time-consuming.

Accordingly, there is a need for improved systems and methods for mounting touch sensor devices to the casing of their respective electronic systems. Other desirable features and characteristics will become apparent from the subsequent detailed description and the appended claims, taken in conjunction with the accompanying drawings and the foregoing technical field and background.

BRIEF SUMMARY OF THE INVENTION

A touch sensor device assembly in accordance with one embodiment is configured to be mechanically coupled to an electronic system having a casing. The touch sensor device assembly includes a touch sensor device and a deformable material disposed on the touch sensor device, wherein the deformable material has a non-adhesive surface. The non-adhesive surface of the deformable material is configured to be compressed against an interior surface of the casing by a holding element such that the touch sensor device is stationary with respect to the casing.

An electronic system in accordance with one embodiment includes a casing having an interior surface, a touch sensor device, and a holding element configured to hold the touch sensor device stationary relative to the interior surface of the casing without causing or otherwise using adhesion of the touch sensor device to the interior surface.

A method in accordance with one embodiment includes removeably attaching a touch sensor device to an electronic system, wherein the touch sensor device is located relative to an interior surface of an electronic system casing. The method includes attaching a deformable component to the touch sensor device, the deformable component having a non-adhesive surface, locating the touch sensor device to the electronic system casing, and mechanically coupling the touch sensor device and the electronic system casing such that the non-adhesive surface is fixedly compressed against the interior surface.

BRIEF DESCRIPTION OF DRAWINGS

Various embodiments of the present invention will hereinafter be described in conjunction with the appended drawings, where like designations denote like elements, and.

DETAILED DESCRIPTION OF THE INVENTION

In general, and as set forth in greater detail below, the present invention relates to systems and methods for maintaining a touch sensor device stationary with respect to the casing of an electronic system without using traditional adhesive techniques. In various embodiments, a deformable material is provided between the touch sensor device and an interior surface of a casing, and a holding element is coupled to the touch sensor device to subject the deformable material to a compressive force.

Figure 1:
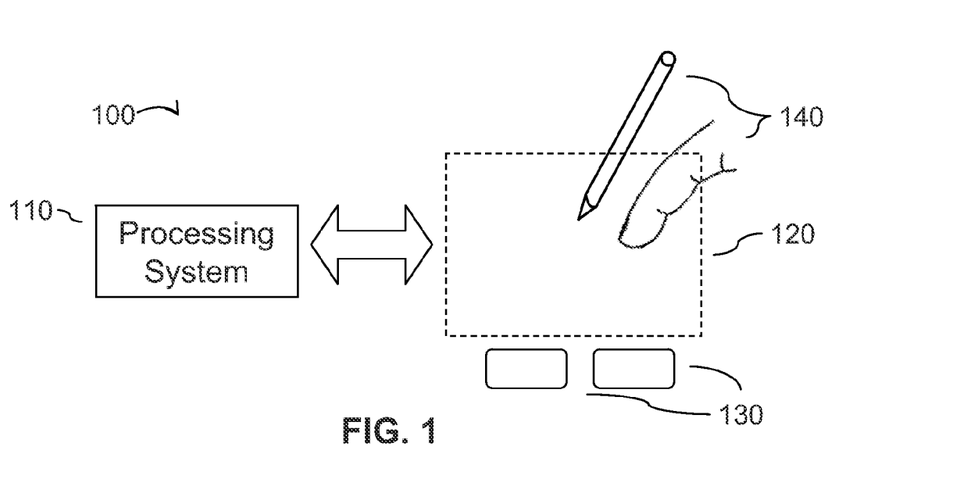
FIG. 1 is a conceptual block diagram of an input device in accordance with one embodiment of the invention.

Turning now to the figures, FIG. 1 is a block diagram of an exemplary input device 100 in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, surface acoustic wave, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitting electrodes and one or more receiving electrodes. Transmitting sensor electrodes may be modulated relative to a reference voltage (e.g., system ground) to facilitate transmission, and receiving sensor electrodes may be held substantially constant relative to the reference voltage to facilitate receipt. Sensor electrodes may be dedicated transmitters or receivers, or may be configured to both transmit and receive.

In FIG. 1, a processing system (or "processor") 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components; in some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

Figure 2:
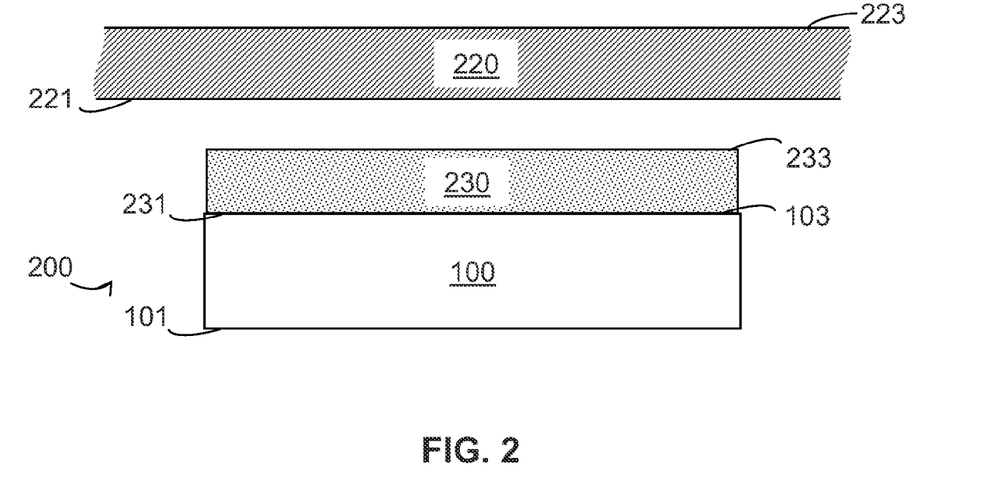
FIG. 2 is a conceptual cross-sectional view of a touch sensor device assembly in accordance with one embodiment.
Figure 3:
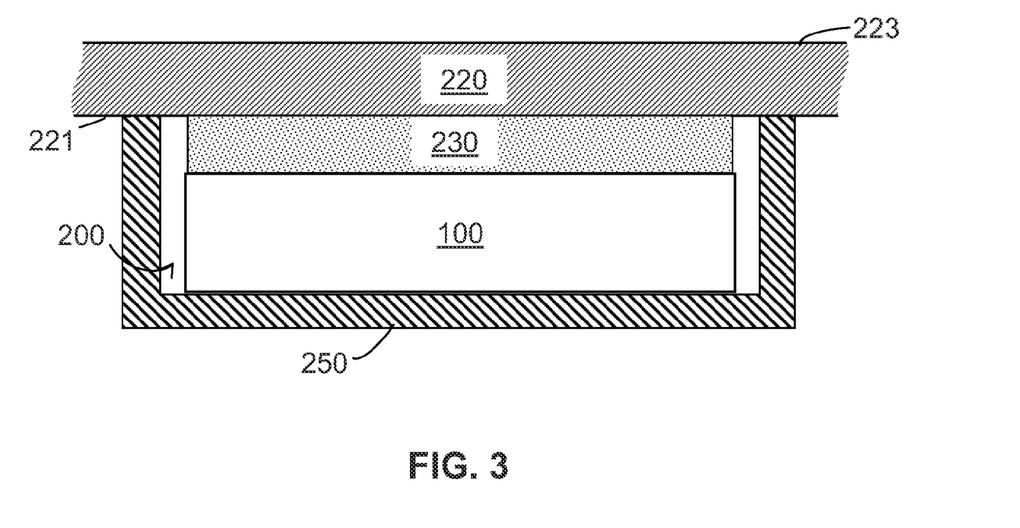
FIG. 3 is a conceptual cross-sectional view of the touch sensor device assembly of FIG. 2 mechanically coupled to a casing.

Referring now to the conceptual, cross-sectional views shown in FIGS. 2 and 3, a touch sensor device assembly (or simply "assembly") 200 in accordance with one embodiment is configured to be mechanically coupled to an electronic system (not shown) having a casing 220. Casing 220 includes a top surface 223 (which may correspond to an "input surface" as described above). Touch sensor device assembly 200 includes a touch sensor device 100 and a deformable material 230 disposed on the touch sensor device (i.e., on a surface 103 of touch sensor device 100).

Deformable material 230 has a non-adhesive surface 233 as well as a surface 231 that may or may not be non-adhesive. Non-adhesive surface 233 of deformable material 230 is configured to be compressed against interior surface 221 of casing 220 by a holding element 250 (shown in FIG. 3) such that the touch sensor device 100 is held stationary with respect to casing 220. Thus, in the illustrated embodiment, holding element 250 (which is suitably coupled to casing 220) indirectly exerts a compressive force on deformable material 230. The compressive force between top surface 233 of deformable material 230 and interior surface 221 of casing 220 results in a frictional force that opposes lateral movement of touch sensor device 100 with respect to casing 220. In this way, touch sensor device 100 is held in place.

Figure 4:
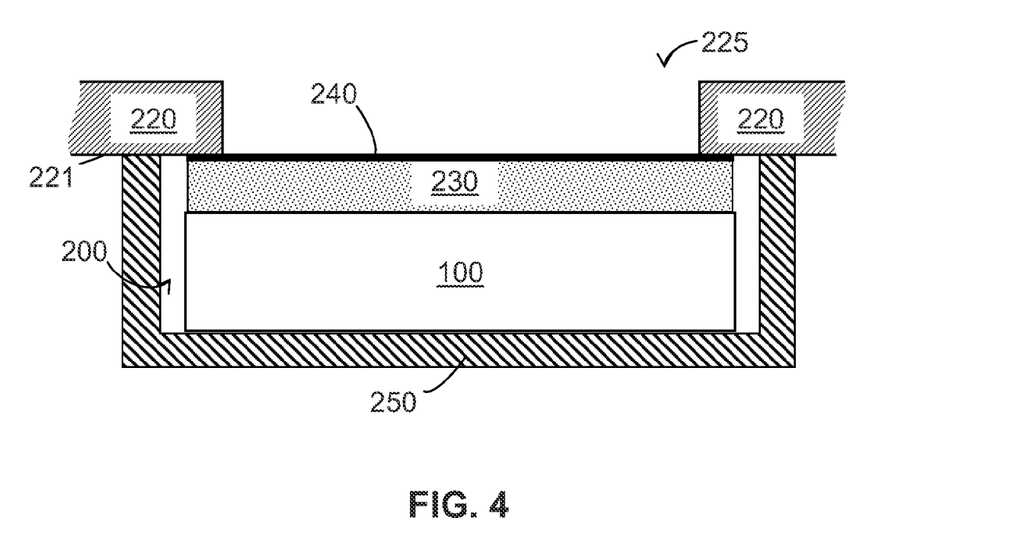
FIG. 4 is a conceptual cross-sectional view of a touch sensor device assembly in accordance with an exemplary embodiment.

Casing 220 may take a variety of forms. For example, casing 220 may be transparent, translucent, or opaque. It may vary in thickness (e.g., being thinner in a region adjacent to assembly 200) or may have a constant thickness. Casing 220 may be, for example, a palm rest of the type used in many portable computers, or a transparent screen used in connection with a portable device. In one embodiment, as depicted in FIG. 4, casing 220 includes an opening 225 that exposes a facesheet 240 that substantially covers the otherwise exposed areas of deformable material 230.

The term "non-adhesive" as used herein and as applied to deformable material 230 means a surface that, when in contact with interior surface 221 of casing 220, exhibits an adhesive force or adhesive strength that is zero or substantially zero. A person skilled in the art will realize that a non-adhesive surface might exhibit some level of adhesion with another surface by virtue of surface moisture, static electricity, and/or Van der Waals forces (dispersive adhesion). However, such small levels of adhesion would still be classified as "non-adhesive" as that term is used herein. In various embodiments, "non-adhesive" might relate, quantitatively, to an adhesion that is below a threshold value as determined using a standardized adhesion test—for example, less than 0.01 N/cm as determined using a standard ASTM "peel" test.

The term "deformable" as used herein and as applied to deformable material 230 means a physical change of dimension, such as that resulting from plastic deformation, elastic deformation, or a combination thereof. The deformation may be reversible or non-reversible. In accordance with one aspect, deformable material 230 is capable of deforming in a way that reduces the number and/or size of air pockets or voids occurring at the interface between casing 220 and deformable material 230. Stated another way, deformable material 230 attempts to conform to the surface against which it is pressed. In this way, the mechanically coupling between surfaces produces a substantially uniform dielectric value between the touch sensor device and an input surface of the electronic system.

In one embodiment, deformable material 230 comprises an elastomer. In a particular embodiment, deformable material 230 comprises a foam, such any of the various urethane foams manufactured by Rogers Corp. Deformable material 230 may be transparent, translucent, or opaque.

Figure 5:
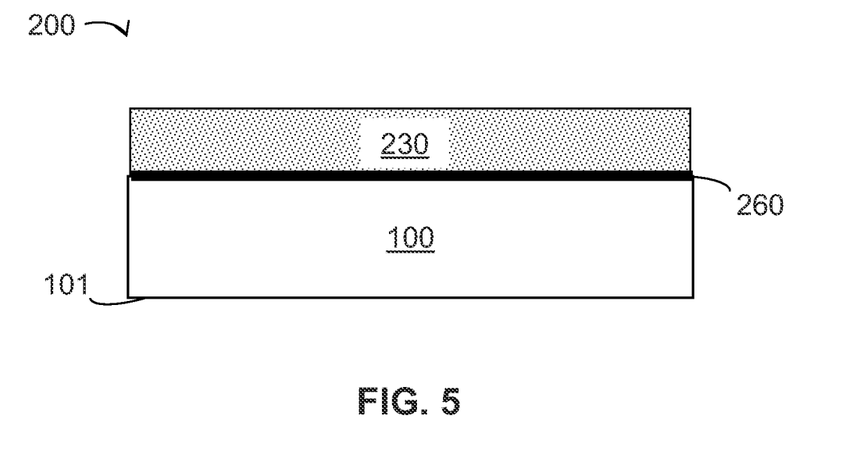
FIG. 5 is a conceptual cross-section view of a touch sensor device assembly in accordance with an exemplary embodiment.

FIG. 5 depicts an embodiment in which an adhesive material 260 is provided between deformable material 230 and sensor device 100. In a further embodiment, deformable material 230 might comprise an adhesive liner of the type used on a variety of adhesive tapes. That is, deformable material 230 and adhesive material 260 as illustrated in FIG. 5 might together form an adhesive tape that has an adhesive surface on one side (facing sensor device 100), and a non-adhesive on the other side.

Figure 6:
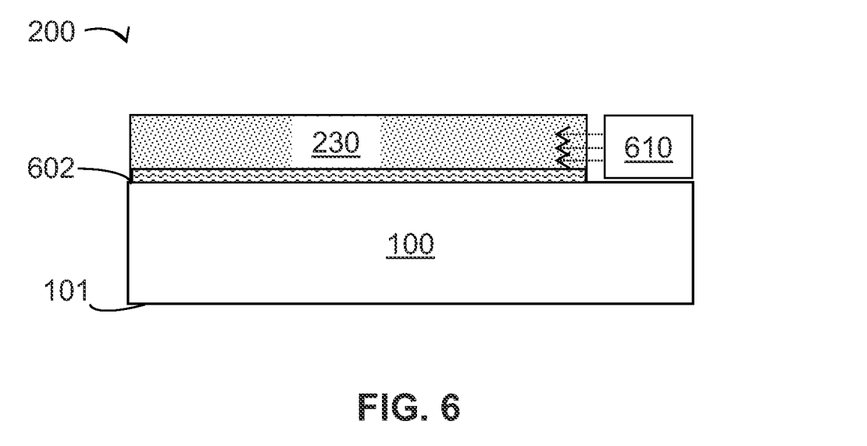
FIG. 6 is a conceptual cross-section view of a touch sensor device assembly in accordance with an exemplary embodiment.

FIG. 6 depicts an alternate embodiment in which deformable material 230 is transparent or translucent (e.g., a light-diffusing elastomeric compound), and wherein a light source 610 (e.g., a light emitting diode) is placed adjacent to deformable material 230 such that at least a portion of its emitted light travels through deformable material 230. In addition, a reflecting layer 602 may also be provided for further controlling the light emitted from light source 610. An embodiment as shown in FIG. 6 is particularly useful for illuminated touch sensor device applications. While FIG. 6 depicts a "side-firing" light source, the invention is not so limited. For example, in other embodiments, a display screen constitutes the light source.

Figure 7:
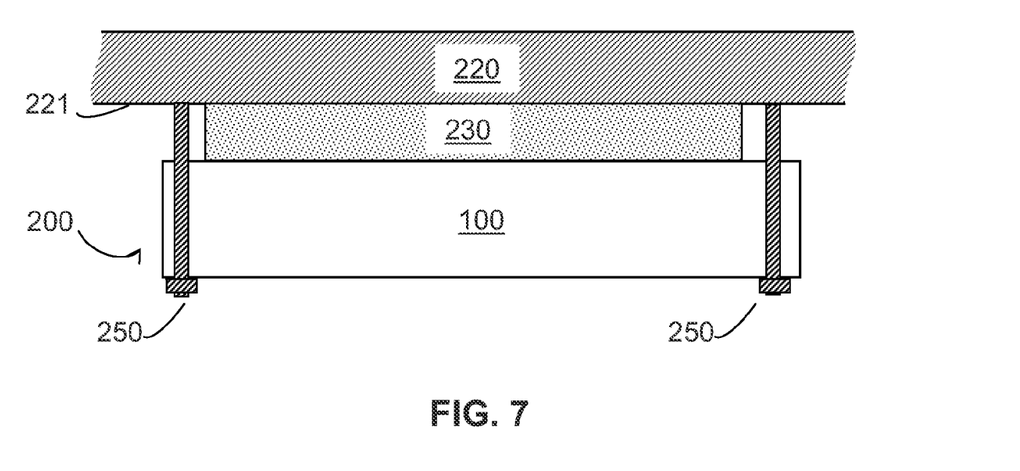
FIG. 7 is a conceptual cross-section view of a touch sensor device assembly in accordance with an exemplary embodiment.

Holding element 250 may be implemented in a variety of ways. In general, as described above, holding element 250 comprises any collection of components that are together configured to exert a force on some surface or part of sensor device 100 such that deformable material 230 is compressed, thereby preventing movement of sensor device 100 with respect to casing 220. Holding element 250 may be attached to casing 230 or integral with casing 230. Holding element 250 may be a passive or active component, such as a display screen as is known in the art. It may comprise various metals, plastics, and/or ceramics. Suitable holding elements 250 include, for example, one or more brackets, screws, tape, glue, snaps, hooks, pins, heat stakes, and/or Velcro-like fasteners adhesive. FIG. 3, for example, shows a bracket-type holding element 250 (and which may be secured to casing 220 in any convenient manner). FIG. 7 shows an alternate embodiment in which holding element 250 comprises two or more pins, screws, or heat stakes extending through (or extending from) sensor device 100 to casing 220 (where they may be inserted in threaded holes, interference fit openings, or the like). In an alternate embodiment, holding elements 250 comprise heat stakes that extend from interior surface 221 of casing 220.

Figure 8:
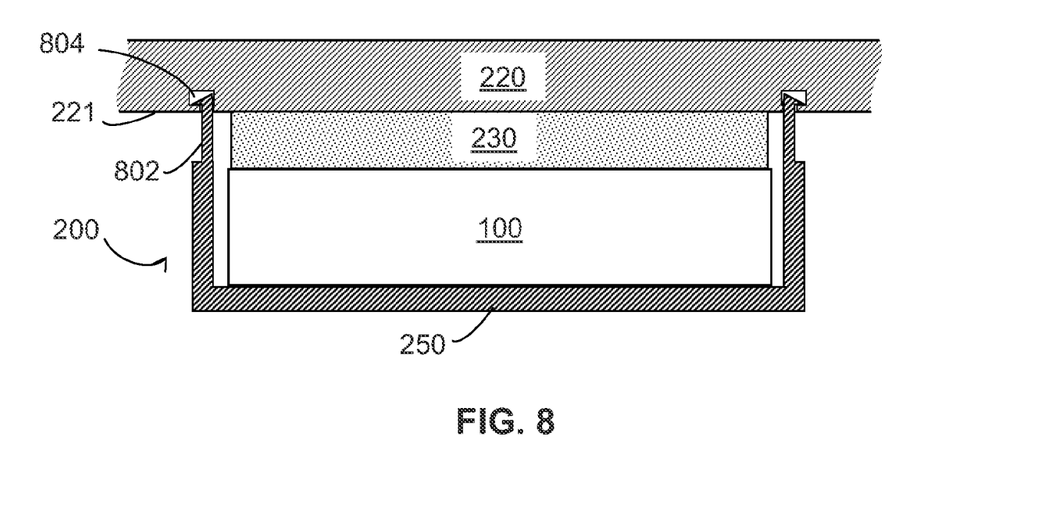
FIG. 8 is a conceptual cross-section view of a touch sensor device assembly in accordance with an exemplary embodiment.

Touch sensor device 100 or holding element 250 may include one or more alignment features configured to match with one or more alignment features of the casing. FIG. 8, for example, shows an embodiment in which a bracket-type holding element 250 includes two or more prongs 802 that are accepted by corresponding alignment features 804, thereby removeably locking holding element 250 in place. Thus, prongs 802 act as alignment features that match with alignment features 804 of casing 220.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A touch sensor device assembly configured to be mechanically coupled to an electronic system having a casing and an input surface, the touch sensor device assembly comprising:
    a touch sensor device; and
    a deformable material disposed directly on the touch sensor device, the deformable material having a non-adhesive surface;
    wherein the non-adhesive surface of the deformable material is configured to be compressed against and to conform to an interior surface of the casing by a holding element such that the touch sensor device is held stationary with respect to the casing, resulting in a compressed deformable material layer having a uniform dielectric value between the touch sensor device and the input surface of the electronic system.

2. A touch sensor device assembly configured to be mechanically coupled to an electronic system having a casing and an input surface, the touch sensor device assembly comprising:
    a touch sensor device; and
    a deformable material disposed on the touch sensor device, the deformable material having a non-adhesive surface;
    wherein the non-adhesive surface of the deformable material is configured to be compressed against and to conform to an interior surface of the casing by a holding element such that the touch sensor device is held stationary with respect to the casing, resulting in a compressed deformable material layer having a substantially uniform dielectric value between the touch sensor device and the input surface of the electronic system; and wherein the deformable material comprises an adhesive layer contacting the touch sensor device, and a liner layer configured to be disposed between the adhesive layer and the interior surface.

3. The touch sensor device assembly of claim 2, wherein the deformable material is substantially transparent and wherein the casing includes a substantially transparent region configured to be adjacent to the touch sensor device.

4. The touch sensor device assembly of claim 2, wherein the deformable material is selected from the group consisting of urethane and foam.

5. The touch sensor device assembly of claim 2, wherein the touch sensor device is configured to sense in a sensing region, and the touch sensor device assembly further comprises:
a display screen underlying the sensing region.

6. A touch sensor device assembly configured to be mechanically coupled to an electronic system having a casing, the touch sensor device assembly comprising:
a touch sensor device; and
a deformable material disposed on the touch sensor device, the deformable material having a non-adhesive surface;
wherein the non-adhesive surface of the deformable material is configured to be compressed against an interior surface of the casing by a holding element such that the touch sensor device is held stationary with respect to the casing, and wherein the non-adhesive surface has an adhesive strength with respect to the interior surface that is less than approximately 0.01 N/cm.

7. The electronic system of claim 6, wherein the holding element comprises a component selected from the group consisting of a brackets, heat stakes, pins, and screws.

8. The electronic system of claim 6, wherein the touch sensor device or holding element includes one or more alignment features configured to match with one or more alignment features of the casing.

9. An electronic system comprising:
a casing having an interior surface;
a touch sensor device; and
a holding element configured to hold the touch sensor device stationary relative to the interior surface of the casing without causing adhesion of the touch sensor device to the interior surface;
wherein the touch sensor device includes a deformable layer that is disposed directly on the touch sensor device, the deformable layer having a non-adhesive surface, wherein the non-adhesive surface of the deformable layer is configured to be compressed against and to conform to the interior surface of the casing by the holding element, resulting in a compressed deformable material layer having a uniform dielectric value between the touch sensor device and an input surface of the electronic system.

10. An electronic system comprising:
a casing having an interior surface;
a touch sensor device; and
a holding element configured to hold the touch sensor device stationary relative to the interior surface of the casing without causing adhesion of the touch sensor device to the interior surface;
wherein the touch sensor device includes a deformable layer having a non-adhesive surface, wherein the non-adhesive surface of the deformable layer is configured to be compressed against and to conform to the interior surface of the casing by the holding element, resulting in a compressed deformable material layer having a substantially uniform dielectric value between the touch sensor device and an input surface of the electronic system; and
wherein the deformable layer comprises an adhesive layer contacting the touch sensor device, and a liner layer configured to be disposed between the adhesive layer and the interior surface.

11. The electronic system of claim 10, wherein the holding element is integral with the casing.

12. The electronic system of claim 10, wherein the holding element comprises a material selected from the group consisting of metals, plastics, and ceramics.

13. An electronic system comprising:
a casing having an interior surface;
a touch sensor device;
a holding element configured to hold the touch sensor device stationary relative to the interior surface of the casing without causing adhesion of the touch sensor device to the interior surface; and
a display screen coupled to the sensor device, wherein the display screen comprises the holding element;
wherein the touch sensor device includes a deformable layer having a non-adhesive surface, wherein the non-adhesive surface of the deformable layer is configured to be compressed against and to conform to the interior surface of the casing by the holding element, resulting in a compressed deformable material layer having a substantially uniform dielectric value between the touch sensor device and an input surface of the electronic system.

14. An electronic system comprising:
a casing having an interior surface;
a touch sensor device; and
a holding element configured to hold the touch sensor device stationary relative to the interior surface of the casing without causing adhesion of the touch sensor device to the interior surface;
wherein the touch sensor device includes a deformable layer having a non-adhesive surface, the non-adhesive surface of the deformable layer is configured to be compressed against the interior surface of the casing by the holding element, and wherein the peel strength of the deformable layer with respect to the interior surface is less than 0.01 N/cm.

15. A method for removeably attaching a touch sensor device to an electronic system, wherein the touch sensor device is located relative to an interior surface of an electronic system casing, the method comprising:
attaching a deformable component directly to the touch sensor device, the deformable component having a non-adhesive surface;
locating the touch sensor device to the electronic system casing;
mechanically coupling the touch sensor device and the electronic system casing such that the non-adhesive surface is fixedly compressed against and conforms to the interior surface, resulting in a compressed deformable material layer having a uniform dielectric value between the touch sensor device and an input surface of the electronic system.

16. The method of claim 15, wherein locating the touch sensor device to the electronic system includes matching a first alignment feature associated with the touch sensor device to a second alignment feature associated with the casing.

* * * * *